(No Model.)  3 Sheets—Sheet 1.

J. C. DONNELLY.
MACHINE FOR MAKING MATCHES.

No. 508,374.  Patented Nov. 7, 1893.

Witnesses
Chas. J. Williamson
Henry C. Hazard

Inventor
Joseph C. Donnelly
by Prindle and Russell
his Attorneys (No Model.) 3 Sheets—Sheet 2.

J. C. DONNELLY.
MACHINE FOR MAKING MATCHES.

No. 508,374. Patented Nov. 7, 1893.

Witnesses
Chas. J. Williamson.
Henry C. Hazard.

Inventor
Joseph C. Donnelly
by Brundage and Russell
his Attorneys

THE NATIONAL LITHOGRAPHING COMPANY,
WASHINGTON, D. C.

(No Model.)  3 Sheets—Sheet 3.

J. C. DONNELLY.
MACHINE FOR MAKING MATCHES.

No. 508,374. Patented Nov. 7, 1893.

Witnesses
Chas. J. Williamson.
Henry C. Hazard.

Inventor
Joseph C. Donnelly
by Kindell and Russell
his attorneys

UNITED STATES PATENT OFFICE.

JOSEPH C. DONNELLY, OF PHILADELPHIA, PENNSYLVANIA.

MACHINE FOR MAKING MATCHES.

SPECIFICATION forming part of Letters Patent No. 508,374, dated November 7, 1893.

Application filed May 11, 1893. Serial No. 473,784. (No model.)

*To all whom it may concern:*

Be it known that I, JOSEPH C. DONNELLY, a citizen of the United States, and a resident of Philadelphia, in the county of Philadelphia, and in the State of Pennsylvania, have invented certain new and useful Improvements in Machines for Making Matches; and I do hereby declare that the following is a full, clear, and exact description thereof, reference being had to the accompanying drawings, in which—

Figure 1:
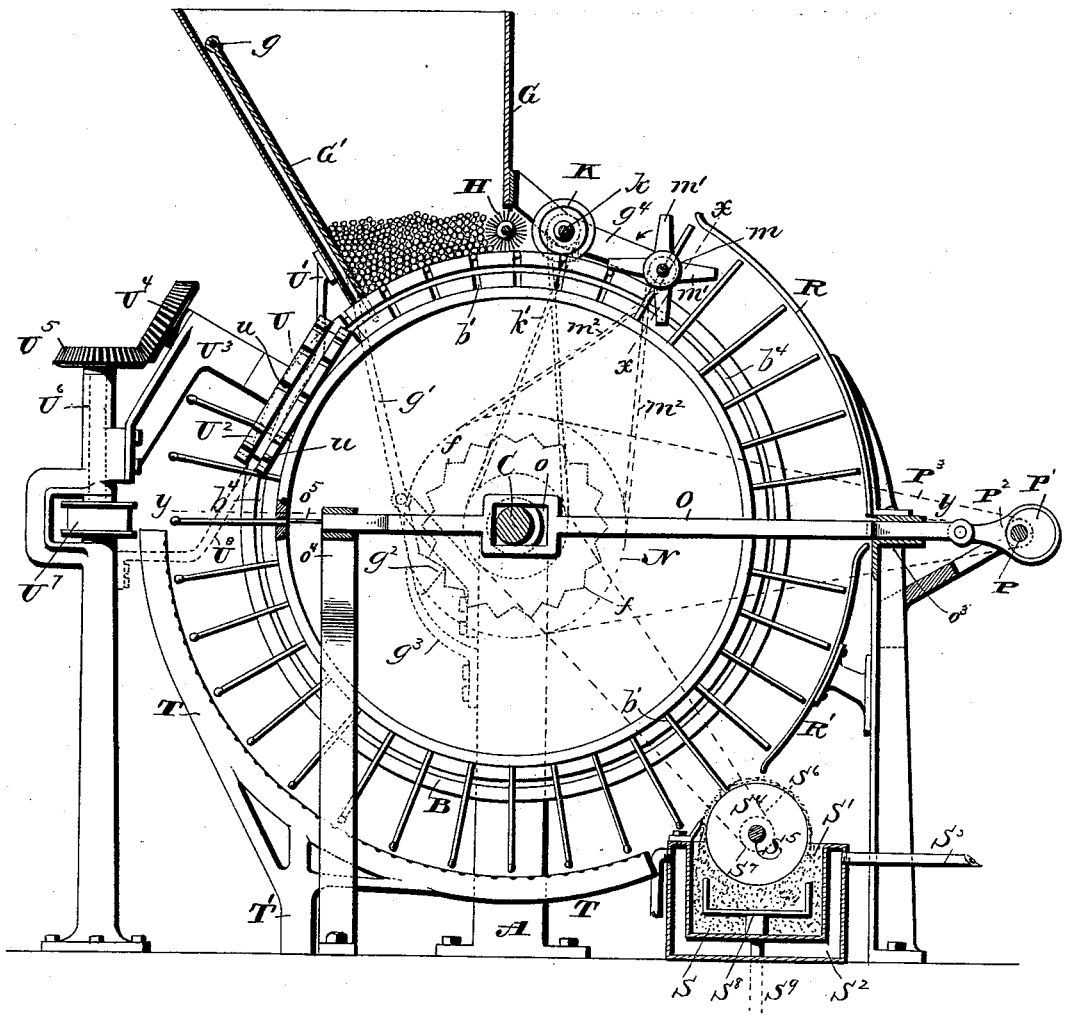
Figure 2:
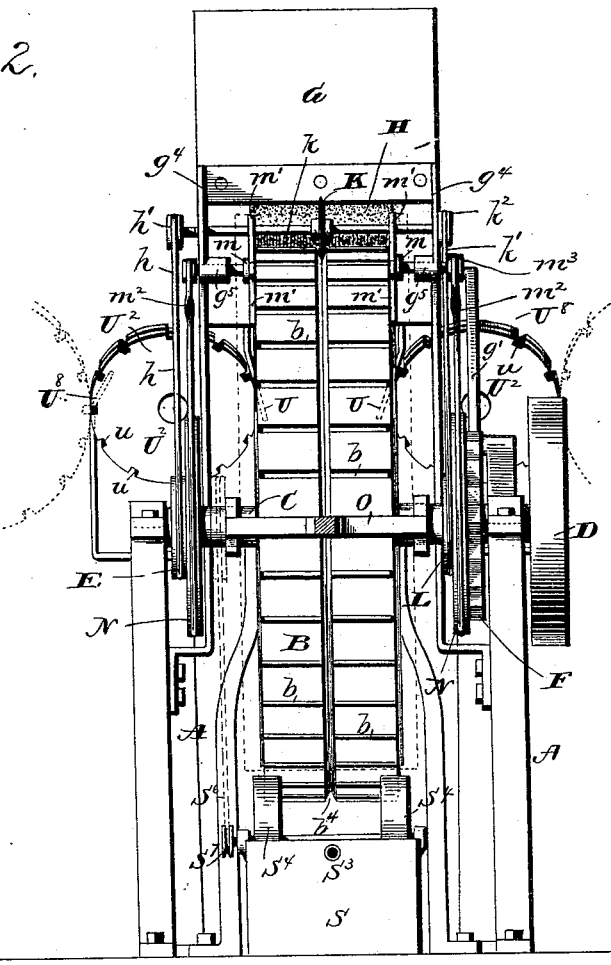
Figure 3:
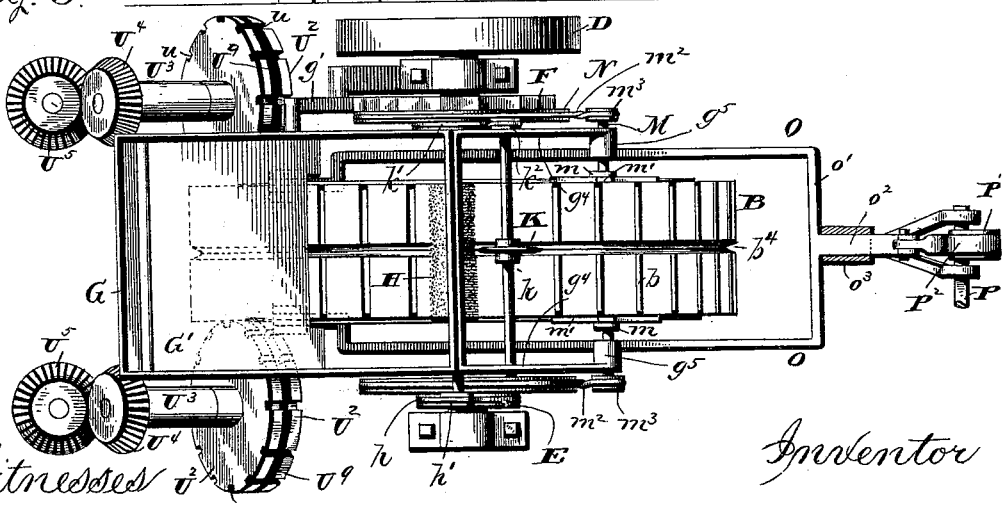
Figure 4:
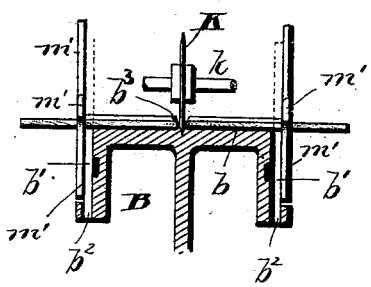
Figure 5:
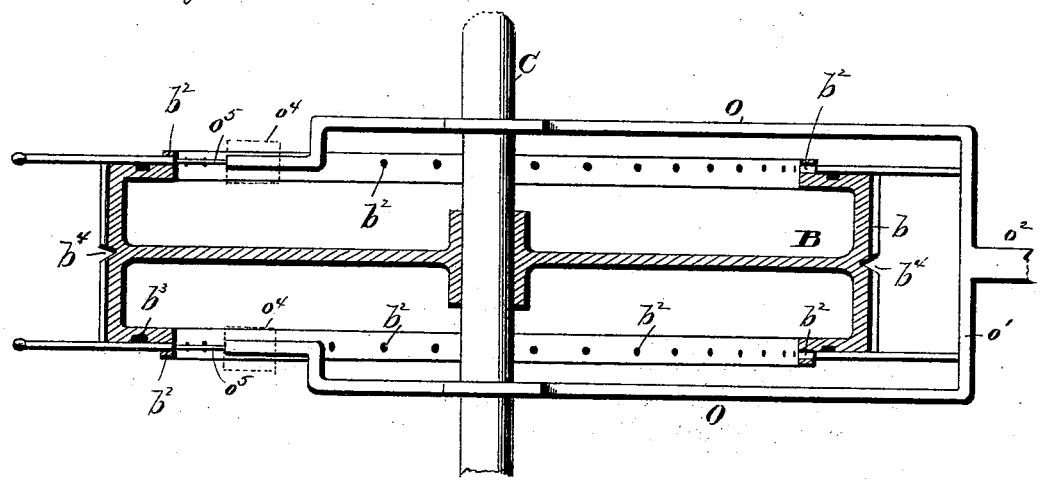

Figure 1 shows a view of my machine partly in side elevation and partly in vertical section; Fig. 2, a view of the same, in end elevation, looking at the end toward which the splints travel from the hopper; Fig. 3, a plan view of the same; Fig. 4, a view of a section on line $x$, $x$, of Fig. 1; Fig. 5, a view of a horizontal section on line $y$, $y$, of Fig. 1.

Letters of like name and kind refer to like parts in each of the figures.

The object of my invention is to provide an improved machine for making matches, and, to this end my invention consists in the machine and the parts thereof, constructed, arranged, and combined, as hereinafter specified.

While it has been my special purpose to provide mechanism for taking the prepared splints from a suitable hopper or feed-device, and applying to them the required heads of ignitible composition, so as to make the matches complete and ready for boxing; I desire it to be understood that the parts of the apparatus, besides the hopper, can be used in direct connection with any suitable form of mechanism for cutting the splints from blocks or veneers, and supplying them directly to the transverse peripheral grooves in the rotary carrying drum or wheel. In such case, a paraffining device, of any of the well known constructions, could be introduced, at some point between the means for feeding the splints into the said grooves, and the device, described and shown in the said drawings, for applying the ignitible composition. I prefer, however, to have the splints, as supplied to the hopper, already treated, as required, with paraffine, wax, or other material, to be applied before the heads are put on.

In the drawings A, A, designate the frame, for supporting the various parts of the machine from a suitable bed or base, and B, designates the splint receiving, holding and carrying wheel or drum fixed upon the shaft C, which is journaled in suitable bearings in the frame. Attached to this shaft is the belt-pulley or wheel D, which is to be driven, by any suitable connections, from any desired form of motor or source of power. Also attached to shaft C, are the grooved wheel E, and the toothed disk F, for a purpose to be described.

The large wheel B has, in its periphery, a series of transverse grooves $b$, $b$, just wide and deep enough to receive and hold one of the match-splints to be acted upon. From the outer ends of such grooves, similarly sized grooves $b'$, $b'$, extend radially down the sides of the wheel, to radial holes $b^2$, $b^2$, each in line with its respective groove $b'$, and adapted to fit and hold the end of a match-splint, pushed longitudinally into it, as hereinafter described. Situated above and extending across the periphery of wheel B is the hopper G, made wide enough to receive the splints to be treated. Such splints, as shown, are of double length, so that two matches can be made from each one, when it is cut in two in the middle. The wheel B is of less width than the hopper, so that the match-splints, as fed into its grooves $b$, $b$, will project beyond the sides of the wheel a distance about equal to the depth or length of the radial grooves $b'$, $b'$.

As shown, the width of the wheel, with reference to the length of the double splints, is such that the splints project beyond each side of the wheel about one sixth of their whole length. These proportions are, as I prefer them, though they can be departed from somewhat, without departure from my invention. The mass of splints, in hopper G, rests directly upon that portion of the grooved wheel periphery, which is below the open hopper-bottom; so that a splint can drop readily into a groove $b$, as the wheel rotates in the direction indicated by the arrow, in Fig. 1.

For jarring and stirring the splints, so that they will get into position parallel with each other, and with the wheel-grooves $b$, $b$, I provide the plate G', which, extending across the rear of the hopper, has its upper edge pivoted to a suitable pivotal pin or rod $g$. Pivotally connected with this plate, is the arm $g'$, which, extending downward, has its lower end provided with a toe $g^2$, to engage the teeth $f f$ on the disk F, toward which it is forced by the spring $g^3$.

The teeth $f, f$, and the toe $g^2$, are, preferably, provided with inclined or beveled contacting faces, as shown; so that said teeth can ride easily past the toe, as the wheel B and shaft C turn, and will cam such toe outward, and let it swing inward again, between them, under stress of its spring $g^3$; so that the arm $g'$ will be given a series of short swings, adapted to make the plate G' jar and shake the mass of splints in the hopper, to straighten them and cause them to become seated in the receiving grooves $b, b$, on wheel B, in the manner indicated hereinbefore.

In order to keep the splints from getting under the edge of plate G', as it swings, I make the latter project down a short distance below the periphery of the grooved wheel on opposite sides thereof.

To prevent any splints, except those properly seated in such grooves $b$ $b$ from being carried out of the hopper, by the motion of wheel B, I provide the brush-roller H, which, being situated above the wheel, in the opening in the rear side of the hopper, is, while having its bristles or wires in contact with the wheel periphery, rotated rapidly, so as to keep back in the hopper any splints resting on such periphery, and not in grooves $b, b$. The shaft of this brush roller can be, as indicated, journaled in the sides of the hopper, and can be rotated by a belt $h$, passing over a pulley $h'$ on the roller shaft, and the grooved pulley or wheel E on the shaft of the grooved wheel B. This arrangement, with the pulley $h$ made, as shown, much smaller than wheel E, will give the desired rapid rotation of the brush-roller, in a direction to carry its under side backward, with reference to the travel of the upper side of wheel B.

Outside of the hopper, and just beyond the brush-roller H, is a cutting disk K, fixed on a rotary shaft $k$, journaled in arms $g^4, g^4$ extending out from the hopper sides. Such shaft is rotated by a band or belt $k'$, which runs over a pulley $k^2$, on said shaft, and a wheel L on the shaft C, the belt being crossed, as shown, so as to make the under side of the cutter-disk travel in the same direction, as the adjoining portion of the periphery of wheel B. The cutter-disk is situated midway between the sides of this latter wheel, and has its edge entering a circumferential groove $b^4$, made deeper than grooves $b, b;$ so that the cutter can cut the match-splints, held in these grooves, entirely through.

Beyond the above described cutting devices are two shafts M, M, situated in line with each other, on opposite sides of the wheel B, being journaled in suitable elongated bearings or sleeves $g^5, g^5$, on the arms $g^4, g^4$. Attached to these shafts, so as to be close to the sides of wheel B, are the hubs $m, m$, each carrying the radial arms $m', m'$, preferably four in number, which, as the respective shafts are rotated, in the direction indicated by the arrow, are adapted to engage the upper sides of the projecting ends of these portions of the splints in grooves $b, b$, which have been severed by the cutter, and force such ends downward, to tilt the respective splint-halves upward, and carry their outer parts down into grooves $b'$, $b'$, as and for the purpose to be more fully described hereinafter. The two shafts are driven by crossed belts $m^2, m^2$, engaging pulleys $m^3, m^3$, on them, and wheels N, N, on the main shaft C. The relation between the size of each pulley $m^3$, and that of its driving wheel N, is such, that one of the arms $m', m'$, will be caused to pass downward, by the side of wheel B, past the end of each groove $b$.

A horizontally reciprocating frame O, having the two side bars extending on opposite sides of the wheel B, and longitudinally slotted at $o$, to permit the passage of shaft C, has the cross-bar or plate $o'$, parallel with the axes of wheel B, adapted, as the frame is moved inward, from the position shown in Fig. 1, to come in contact with the outer ends of the uptilted splint-halves carried in grooves $b', b'$, of the wheel, and force such halves longitudinally inward, to seat their inner ends in the respective radial holes $b^2, b^2$, so that they will be held steadily in their radial positions. Such cross-bar is only of width sufficient to engage the ends of one pair of match-splint-halves at a time. The frame is supported, in its reciprocation, by an outwardly projecting part or tang $o^2$ held and guided in a guide $o^3$ on the frame, and by guides $o^4, o^4$, receiving and guiding portions of the side bars, at or near the inner ends of the latter, as shown in the drawings, Figs. 1 and 5. On the extreme end of each of such bars, is a pin $o^5$, adapted, when the frame is moved inward, as described, to enter one of the radial holes $b^2;$ so as to push out therefrom any match end seated therein.

The grooves $b, b, b', b'$, and the corresponding holes $b^2, b^2$, on wheel B, are so arranged, with reference to each other and the frame O, that, as the bar or plate $o'$ is engaging the outer ends of a pair of match-splint-halves, and forcing them inward, the pins $o^5, o^5$, on the side bars of the frame, will be engaging and pushing the match ends out of a pair of holes $b^2, b^2$, on the diametrically opposite part of the wheel, said pins being made smaller than the holes, and of spring material to allow motion of the wheel.

For actuating the reciprocating frame O, so that it will perform its function properly, I provide a shaft P, supported in suitable bearings, with an eccentric P', and have the strap P², engaged by the latter, connected with the tang or outwardly projecting part $o^2$ of the frame.

A belt P³ drives the pulley P⁴ fixed on the eccentric carrying shaft, and is itself driven by a wheel on shaft C, which may be one of the wheels from which the shafts M, M, are driven, described hereinbefore.

A guard or shield R, concentric with, and at such distance from the periphery of wheel B as to just clear the ends of the radially standing match-splint-halves, extends from the point where the latter are tilted up into their radial positions, down to or near the reciprocating frame O.

A second guard R' similarly curved, but closer to the wheel B, so as to just clear the outer ends of the match-splint-halves, after the latter have been pushed in, to seat their inner ends in the radial holes $b^2$, $b^2$, as described hereinbefore, extends from a point just below the frame O, downward and forward to the dipping device, for applying the igniting composition to the outer ends of the splint-halves, as the wheel B revolves. This device is of the well known form, consisting essentially of a vat or receptacle S containing the composition S', and surrounded by a heating jacket $S^2$, to which steam, hot-water, or other heating medium, is supplied, from any suitable source of supply, by pipe $S^3$, and rollers $S^4$, revolving in the body of composition; so as to be covered thereby, and convey some of it to their upper sides, into the path of the respective series of match-splint ends, as they are carried along by the rotation of wheel B. These rollers $S^4$ are fixed upon shaft $S^5$, which is driven by a belt or band $S^6$, passing over a pulley $S^7$, on said shaft, and one of the belt-wheels on main shaft C, as indicated in the drawings.

A stirrer $S^8$ consisting of a bar or plate, with upturned arms, is placed within the composition in vat S, and is attached to a rotary shaft $S^9$, which, extending up through the vat-bottom, can be rotated in any desired way, or by any suitable means. After leaving the rollers $S^4$, $S^4$, the match-splint-halves, with the composition on their outer ends, pass on close to the cooling and drying device T, which, as shown, consists of a pipe, curved to stand close to the headed ends of the matches, as they are moved along, by the rotation of wheel B, and having its inner side perforated, to deliver, over the match-heads, a blast of cold air, supplied to it by one or more pipes T', connected with any suitable source of supply.

While one pipe T, if perforated, so as to direct the cold air over and into contact with the two series of match heads, can be made to secure the desired cooling and drying of the heads; I contemplate using two, if desired, each one being arranged close to its respective series of headed matches, instead of opposite a central line between such series, as where one pipe is used.

The motion of the frame O is a very short one, being just sufficient to cause its pins $o^5$, $o^5$, to move the matches engaged by them directly outward, to free their inner ends from the radial holes $b^2$, $b^2$. The matches thus freed from the holes are still held in the radial grooves $b'$, $b'$, and are carried onward and upward by the movement of the wheel B; until they reach the discharging guides U, U, which consist of fingers on opposite sides of the wheel B, which, extending in a direction opposite to that of the rotation of said wheel project inward, at an angle, into the annular grooves $b^3$, $b^3$, on the respective sides of the wheel. Such grooves are made deeper than the radial ones $b'$, $b'$, in order that the inclined parts of the fingers may extend inward, at an angle to the sides of the wheel, to points below the bottoms of the grooves $b'$, $b'$; so that, as the wheel revolves, the matches will ride up on the inclines of the fingers, until they are moved outward away from the grooves in which they were seated.

I prefer to have the match discharging fingers as shown forming the fork arms on a shank U' attached to the hopper G, or any other desired part of the frame.

On opposite sides of the wheel B, just where the matches are disengaged from their respective holding grooves $b'$, $b'$, I provide the take off devices consisting of wheels $U^2$, $U^2$, which have in their peripheries, the transverse grooves $u$, $u$, like those designated by $b'$, $b'$, on the wheel B. These wheels are so journaled with reference to the latter, that, as any one of the grooves $u$, $u$, is brought around to the side of the wheel B, it will be exactly parallel to a radial line on such wheel, and, consequently, parallel to any one of the grooves $b'$, $b'$, which may be brought around to a point just opposite it. This point, where the grooves on a wheel $U^2$ become parallel to and opposite grooves on wheel B, is where the fingers of the discharging device remove the matches from the latter grooves. Being lifted thus out of the grooves, in which they have been held, the matches are transferred into the grooves $u$, $u$, of the wheels $U^2$, $U^2$, and are carried forward and outward by the rotation of the latter wheels. The rotation of the wheels $U^2$, $U^2$, is such, that each of such wheels will have one of its grooves $u$, $u$, brought around opposite wheel B, as each groove $b'$ passes the respective discharging finger which lifts the match out of the groove. Any desired form of means or gearing for thus rotating the wheels $U^2$, $U^2$, with reference to wheel B, can be used. As shown, each of such wheels has a shaft journaled in bearings $U^3$, and provided with a bevel gear $U^4$, meshing with and driven by the corresponding gear $U^5$ fixed on a shaft $U^6$ carrying a pulley or belt-wheel, driven by a belt $U^7$ from any suitable motor or source of power, or even from the main shaft C, by suitable connections.

For removing the matches from the grooves $u$, $u$, of each wheel $U^2$, any suitable device may be used. The one which I show is an inclined guide $U^8$, which, being attached to any suitable support, extends rearward and inward with reference to the travel of the matches, into a peripheral groove $U^9$ in the respective wheel, made deeper than the grooves $u, u$.

The operation of my machine, which will be understood from the foregoing description, is briefly as follows:—With the double length match-splints fed into the hopper, so as to be in a mass resting upon the periphery of the wheel B, as the shaft C revolves, the shaking plate G' is given a series of short swings, by the action of the spring $g^3$ and the engagement of the teeth $f, f,$ on wheel F, with the toe $g^2$; so that the splints are shaken up and jarred into position, to enable the lowest ones to drop easily into the grooves $b, b$, as the latter are moved along past the open hopper bottom. The rotating brush-roller keeps back any splints not seated in said grooves; while those so seated are carried on out of the hopper by the rotation of wheel B. These splints, projecting at their opposite ends beyond the sides of such wheel, are cut in two centrally, by the cutting disk or wheel K, so as to make blanks for two matches. After this cutting, the splints are carried along; so that their projecting ends are brought into the paths of the arms $m', m',$ of the tilting devices, consisting as described, of rotary hubs, on each side of wheel B, each carrying radial arms adapted to engage and bear down upon the upper sides of the projecting portions of the splints, close to the sides of the wheel. These arms $m', m',$ bearing down on the outer portions of the divided match-splint halves, swing such portions downward and seat them in the radial grooves $b', b',$ as shown best in Fig. 4. The match-blanks or match-splint halves, thus tilted up into and held in radial positions by the respective grooves $b', b',$ being carried onward by the rotation of wheel B, are brought opposite the reciprocating frame O; so as to be pushed longitudinally inward by the cross-bar or plate $o'$ thereof, to seat their inner ends in the respective radial holes $b^2, b^2$. They are then quite firmly held in their radial positions, ready for dipping, without any danger of their becoming loosened or detached from the wheel. Where the splints have not been treated with paraffine, wax, or other material, before being placed in the hopper, they are to be next passed through the paraffining or waxing device, which can be of any of the well known constructions of such apparatus. Being ready for the application of the heads of ignitible material, the radially projecting match-splint halves travel onward, so that their ends come in contact with the layer of composition on the rollers $S^4 S^4$ of the dipping or heading device, sufficiently to take off on them enough of the composition to make the required heads. The headed matches then pass on close to the perforated pipe or pipes of the cooling and drying device, by which the cold air is delivered over and around the heads to cool and dry the same quickly. As each pair of matches formed from the halves of one splint, are brought around in line with the pins $o^5, o^5,$ on the reciprocating frame O, such frame travels inward with relation to wheel B, so as to cause the said pins to enter the holes $b^2, b^2,$ which hold the inner ends of such matches, and move such ends outward out of the holes. As described hereinbefore, the grooves $b$ $b$, and $b', b',$ are so arranged with reference to each other and to the frame O, that, each time such frame is moved inward to cause its bar or plate $o'$ to seat a pair of match-splint halves in the respective holes $b^2, b^2,$ the pins $o^5, o^5,$ will move a pair of headed matches from the respective holding holes on the diametrically opposite side of wheel B. After being thus disengaged from the holes $b^2, b^2,$ of the latter wheel, the matches, still held in radial grooves $b', b',$ travel onward, to the inclines of the guides for disengaging or moving them out of the said grooves. These inclines cause the matches to move from grooves $b', b',$ to the peripheral grooves $u, u,$ in the take off wheels $U^2, U^2,$ by which the matches are carried off outward away from the sides of the wheel B. By this arrangement, I not only secure the proper removal of the matches from the wheel B, before they reach the hopper G, but also increase the length of their travel after the dipping; so that the composition forming their heads may have a longer time to become perfectly cool and dry before being taken for boxing. The take-off wheels $U^2, U^2,$ could, of course, be increased in size, where greater travel of the matches is desired. Having been carried around by these wheels the matches are shed out from the grooves $u, u,$ thereof by the inclined guides $U^3, U^3,$ or can be removed from the wheels in any other desired way, without departure from my invention. If desired, they could then be taken by other wheels similar to wheels $U^2, U^2,$ being moved into the grooves therein by the guides, just as they are moved from grooves $b', b',$ in wheel B, into those of wheels $U^2, U^2$. Such additional grooved wheels, I have only indicated in dotted lines, as their construction and operation will be fully understood from the description of wheels $U^2, U^2,$ hereinbefore given.

With my machine, constructed and operating, as described, the manufacture of matches from the splints, furnished from the hopper, or other feeding or splint supplying device, can be made a continuous one, not requiring any handling of the splints or matches, until the latter are completed and ready for boxing.

Having thus described my invention, what I claim is—

1. In a match making machine, in combination with a suitable splint feeding device, a moving carrier having transverse grooves shorter than the splints, and other grooves at an angle to the transverse ones, a cutter to cut the splints in two, and tilting devices to engage the outer portions of the divided parts of the splints, and force them down into the grooves which are at an angle to the transverse ones, substantially as and for the purpose specified.

2. In a match making machine, in combination with a suitable splint feeding device, a moving carrier having transverse grooves shorter than the splints, and other grooves at an angle to the transverse ones, with splint end receiving holes at their lower ends, a cutter to divide the splints in two, tilting devices to engage the projecting portions of the splint-halves lying in the transverse grooves, and force them down into the other grooves, and a pusher to push the tilted splint-halves endwise into the holes at the lower ends of the latter grooves, substantially as and for the purpose shown.

3. In a match making machine, in combination with a suitable splint feeding device, a moving carrier having transverse grooves shorter than the splints, and other grooves at an angle to the transverse ones, with splint receiving holes at their lower ends, a cutter to divide the splints in two, tilting devices to engage the projecting portions of the splint-halves lying in the transverse grooves, and force them down into the other grooves a pusher to push the tilted splint-halves into the holes at the lower ends of the latter grooves, and a composition supplying device in the path of the upturned ends of the splint-halves, substantially as and for the purpose set forth.

4. In a match making machine, in combination with a suitable splint feeding device, a moving carrier having transverse grooves shorter than the splints, and other grooves at an angle to the transverse ones, with splint receiving holes at their lower ends, the splint dividing cutter, the tilting devices to engage the projecting portions of the divided splint-halves, and force them down into the grooves at an angle to the transverse ones, a pusher to push the tilted splint-halves into the holes, a composition applying device in the path of the upturned ends of the splint-halves, and means for forcing a blast of cold air into contact with the applied heads, substantially as and for the purpose described.

5. In a match making machine, in combination with a suitable splint feeding device, a moving carrier having transverse grooves shorter than the splints and other grooves at an angle to the transverse ones with holes at their lower ends, the splint dividing cutter, the tilting device to engage the portions of the splint halves projecting beyond the ends of the transverse grooves, and force them down into the other grooves, a pusher to push the tilted splint-halves longitudinally into the holes of the carrier, an igniting composition applying device in the path of the outer ends of the tilted splint halves, and means for pushing the inner ends of the headed splint-halves out of the holes in the carrier, substantially as and for the purpose specified.

6. In a match making machine, in combination with a suitable match-splint feeding device, a rotary wheel having transverse grooves shorter than the splints, and radial grooves running inward from the ends of the transverse ones, the splint dividing cutter, and tilting devices to engage the portions of the divided halves of the splints which project beyond the ends of the transverse grooves, and force them down into the radial grooves, substantially as and for the purpose shown.

7. In a match making machine, in combination with a suitable splint feeding device, a rotary wheel having transverse grooves shorter than the splints, and radial grooves running inward from the ends of the transverse ones, the splint dividing cutter, and the rotary tilting devices on opposite sides of the wheel having arms passing down close to the wheel sides, to engage with projecting portions of the match-splint-halves and swing them down into the radial grooves, substantially as and for the purpose described.

8. In a match making machine, in combination with a suitable splint feeding device, a rotary wheel having transverse grooves shorter than the splints, radial grooves, and holes in line with the latter grooves, the splint dividing cutter, the tilting devices close to opposite sides of the wheel, to engage and force down into the radial grooves the outer portions of the divided splint-halves, and the reciprocating pusher having a portion to engage the outer ends of the tilted splint-halves and force them inward, to seat the inner ends of such halves in the holes in the wheel, substantially as and for the purpose set forth.

9. In a match making machine, in combination with a suitable splint feeding device, a rotary wheel having transverse grooves shorter than the splints, and radial grooves running inward from the outer ends of the transverse ones, the splint dividing cutter, the tilting devices to engage the outer portions of the splint-halves, and force them down into the radial grooves, and means for bringing a supply of heading composition into the path of the outer ends of the splint-halves, as they are carried around by the rotation of the wheel, substantially as and for the purpose specified.

10. In a match making machine, in combination with a suitable splint feeding device, a rotary wheel having transverse grooves shorter than the splints, radial grooves running inward from the transverse ones, and radial holes at the inner ends of the radial grooves, the splint dividing cutter, the tilting devices on opposite sides of the wheel to engage the projecting portions of the splint-halves and force them down into the radial grooves, the reciprocating frame having a bar to engage the outer ends of the tilted splint-halves and force them inward, and means for applying the heading composition to the outer ends of the splint-halves, as they are carried along by the motion of the wheel, substantially as and for the purpose shown.

11. In a match making machine, in combination with a suitable splint feeding device, a rotary wheel having transverse grooves shorter than the splints, radial grooves extending inward from the transverse ones, and holes at the inner ends of the radial grooves, the splint dividing cutter, the tilting devices on opposite sides of the wheel, to engage the projecting portions of the splint-halves and force them down into the radial grooves, the reciprocating frame extending across on opposite sides of the wheel, having a portion to engage the outer ends of the splint-halves and force them inward, and pins to move the inner ends of the splint-halves out of the holes in the wheel, and a heading composition applying device arranged to apply the composition to the outer ends of the tilted splint-halves at a point between the places where such splint-halves are moved into and out of the holes in the wheel by the reciprocating frame, substantially as and for the purpose described.

12. In a match making machine, in combination with a suitable splint feeding device, a rotary wheel having the transverse and radial grooves, the cutter, the tilting devices on opposite sides of the wheel to engage the projecting portions of the splints, and stripping guides extending into annular grooves on opposite sides of the wheel and standing at an angle to the travel of the radial grooves so as to force any splints out of them as the wheel rotates, substantially as and for the purpose specified.

13. In a match making machine, in combination with a rotary wheel having a series of radial grooves to hold portions of the match splints, and an annular groove intersecting the radial ones, a stripping guide extending down into the annular groove at an angle to the travel of the splints held in the radial grooves, substantially as and for the purpose shown.

14. In a match making machine, in combination with the rotary wheel having a series of radial grooves to hold portions of the splints, and an annular groove intersecting the radial ones, a stripping guide extending at an angle down into the annular groove and a movable take off device having a moving surface provided with splint receiving grooves, coming opposite to those on the wheel at the point where the stripping guide crosses the path of the radial grooves in the wheel, substantially as and for the purpose set forth.

15. In a match making machine, in combination with the rotary wheel having a series of radial grooves with splint end receiving holes at their inner ends, an igniting composition applying device, means for pushing the ends of the splints out of the holes in the wheel, and a stripping guide to clear the radial grooves of their contents, substantially as and for the purpose described.

16. A match making machine having a wheel or carrier provided with splint engaging openings in both of its sides, substantially as and for the purpose shown.

17. A match making machine having a wheel with peripheral grooves and radial grooves that run from the other, substantially as and for the purpose set forth.

18. In a match making machine, in combination with the rotary wheel having a series of radial grooves with holes at their inner ends, a movable piece having a portion to enter and clear such holes successively as the wheel revolves, a stripping guide extending at an angle across the path of the grooves, and a revolving wheel having transverse grooves adapted to come parallel with and close to the radial grooves of the first wheel, at the point where the stripping guide intersects the path of the radial grooves, substantially as and for the purpose shown.

19. In a match making machine, in combination with the rotary wheel having the radial grooves on its opposite sides, the two rotary take off wheels on opposite sides of the first wheel, having transverse grooves adapted to come parallel to the radial ones in the first wheel as they are brought around close to the sides of the latter by the rotation of their respective wheels, and inclined stripping guides to cause any portions of splints held in the radial grooves of the first wheel, to move out of the same into the grooves of the take-off wheels, substantially as and for the purpose set forth.

In testimony that I claim the foregoing I have hereunto set my hand this 9th day of May, A. D. 1893.

JOSEPH C. DONNELLY.

Witnesses:
L. P. SQUIER,
K. C. HORIGAN.